US011766153B2

(12) United States Patent
O'Donnell et al.

(10) Patent No.: US 11,766,153 B2
(45) Date of Patent: Sep. 26, 2023

(54) TRI-CYLINDRICAL HERB GRINDER

(71) Applicants: Liam O'Donnell, Rawley, NC (US);
Meighan O'Donnell, Rawley, NC (US)

(72) Inventors: Liam O'Donnell, Rawley, NC (US);
Meighan O'Donnell, Rawley, NC (US)

(*) Notice: Subject to any disclaimer, the term of this patent is extended or adjusted under 35 U.S.C. 154(b) by 273 days.

(21) Appl. No.: 17/236,968

(22) Filed: Apr. 21, 2021

(65) Prior Publication Data

US 2022/0338676 A1    Oct. 27, 2022

(51) Int. Cl.
*A47J 42/34* (2006.01)
*A47J 42/46* (2006.01)
*A47J 42/40* (2006.01)

(52) U.S. Cl.
CPC ............... *A47J 42/34* (2013.01); *A47J 42/40* (2013.01); *A47J 42/46* (2013.01)

(58) Field of Classification Search
CPC .. A47J 42/12; A47J 42/14; A47J 42/20; A47J 42/34; A47J 42/42; A47J 42/04; A47J 42/24
See application file for complete search history.

(56) References Cited

U.S. PATENT DOCUMENTS

2012/0241543 A1* 9/2012 Tang ...................... A47J 42/04
241/168

FOREIGN PATENT DOCUMENTS

WO    WO-2017017531 A2 *  2/2017  ............. A47J 42/24

* cited by examiner

*Primary Examiner* — Matthew Katcoff
(74) *Attorney, Agent, or Firm* — Steven Rinehart

(57) ABSTRACT

A grinder adapted to grind plant material having a handle and three cylindrical receptacles, each receptacle comprising teeth. Plant material is ground when the handle is rotated axially. The teeth are interconnected through a shaft and gears to the handle. An elongated shaft traversing the receptacles and lower gears rotate axially when the handle is rotated.

11 Claims, 7 Drawing Sheets

TRI-CYLINDRICAL HERB GRINDER

BACKGROUND

Field of the Invention

This invention relates to apparti for grinding plant fibers such as herbs, plants, tea, tobacco, seeds and leaves, and more particularly relates to an apparatus for grinding legal cannabis.

Description of the Related Art

An herb grinder typically comprises top and bottom haves which separate to facilitate insertion and extractions of herbs and plant material. Herb grinders are typically operated to grind herbs, spices, salts, and other perishable items into particulates for cooking, smoking, or storage.

Herb grinders may be used to shred tobacco and cannabis to produce fibers which can be rolled and evenly smoked. As cannabis becomes legal across many U.S. states, grinders are in higher-and-higher demand for recreational and medicinal purposes.

Most herb grinders used in residential and small commercial settings and are manually driven. Electronic grinders are known in the art, but can generate heat, damage product, and produce fire hazards, and are more expensive. Additionally, electronic grinders do not impart the same level of control to a user grinding plant materials, who may wish to apply differing torque forces to a handle during the grinding process to change the texture and evenness of the ground product.

Although hand grinders are inexpensive and convenient, they have limited vertical loading capacity, which creates difficulty in production for many users. Additionally, they are often unnecessarily cumbersome and ground plant material can be difficult to extract from them. There exists a need in the art for a grinding and storing device which has a higher loading capacity for residential and small commercial settings which overcomes these shortcomings in the prior art.

SUMMARY

From the foregoing discussion, it should be apparent that a need exists for a tri-cylindrical herb grinder. The present invention has been developed in response to the present state of the art, and in particular, in response to the problems and needs in the art that have not yet been fully solved by currently available grinders. Accordingly, the present invention has been developed to provide a tri-cylindrical herb grinder, the grinder comprising: three cylindrical receptacles, each receptacle defining a hollow interior recess, the cylindrical receptacles comprising: a hollow cylindrical body; an annular skirt affixed to a top edge of the receptacle, the annular skirt more narrow in diameter than a main body of the cylindrical receptacle; a lower gear; a stabilizing shaft protruding inferiorly from the cylindrical body; a plurality of teeth adapted to grind plant material; a triangular mounting bracket affixed to three circular caps; a handle disposed above the triangular mounting bracket, adapted to rotate axially relative to the triangular mounting bracket; a triangular base member affixed to the cylindrical receptacles; an elongated shaft interconnecting the handle and a gear, the elongated shaft traversing the grinder longitudinally; wherein the gear simultaneously engages all three lower gears, such that the lower gears are axially rotated with the handle.

The cylindrical receptacles may further comprise a floor defining a plurality of apertures, the apertures of a predetermined diameter, the apertures adapted to allow ground plant material failing to exceed the diameter to fall through the apertures.

Each cap may comprise a plurality of inferiorly protruding teeth. The teeth comprise variously dimensioned sharp, jagged protuberances in various embodiments.

The handle may be spherical. The handle may define a plurality of recesses serving ergonomic function. The triangular base member may be affixed using a friction fit.

In some embodiments, the apparatus further comprises a plurality of annular inserts positioned within cylindrical protuberances rising from a surface of the triangular base member. The plant material comprises cannabis.

The apparatus may further comprise a ferrule affixed to a terminal inferior end of the elongated shaft.

The apparatus of claim 1, wherein the bodies of the cylindrical receptacles form a friction fit with the caps.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
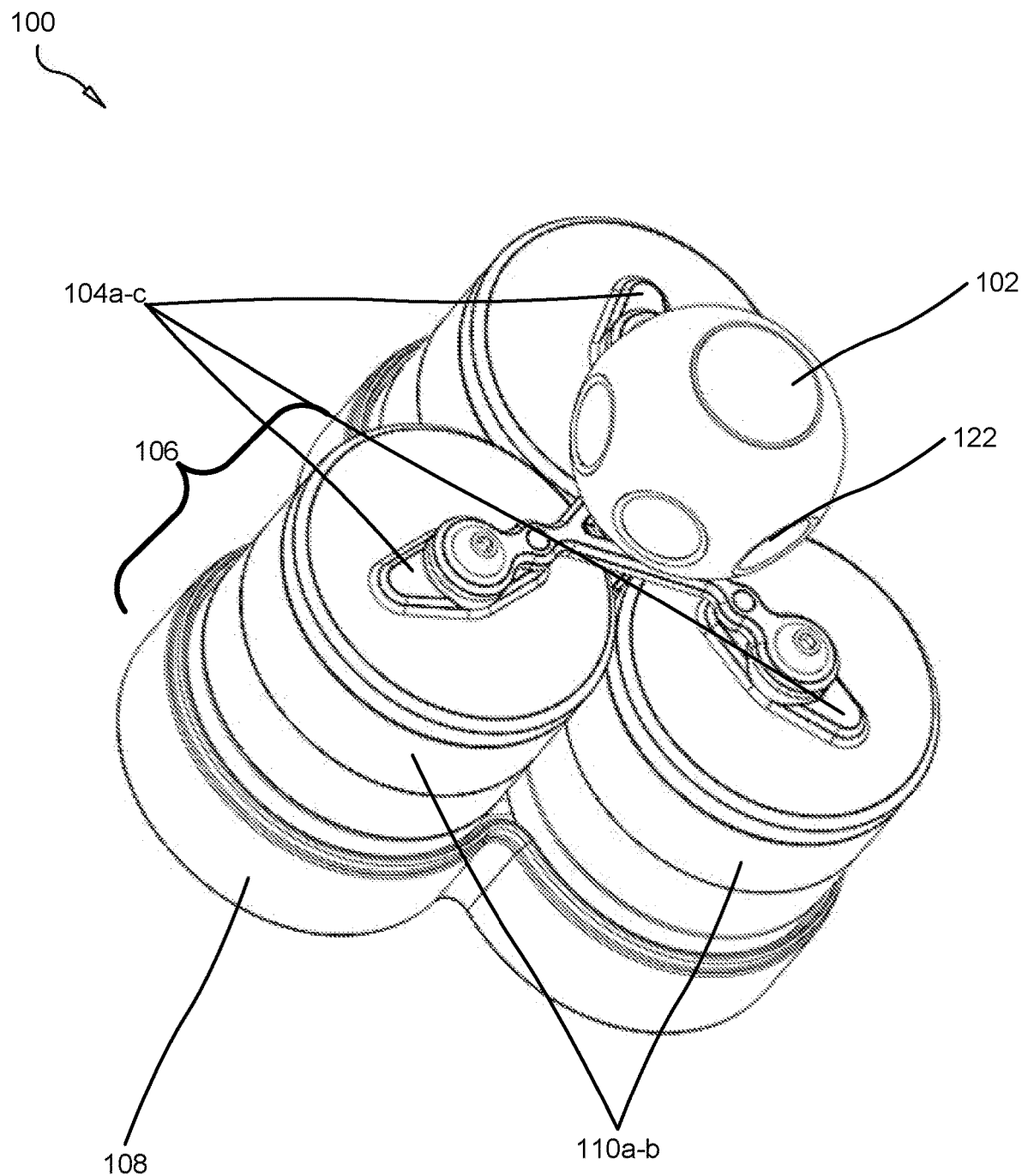
FIG. 1 is an isometric perspective view illustrating one embodiment of a tri-cylindrical herb grinder in accordance with the present invention.

FIG. 1 is an isometric perspective view illustrating one embodiment of a tri-cylindrical herb grinder 100 in accordance with the present invention.

The apparatus/grinder 100 comprises a handle 102 which is centrally disposed above the cylindrical housings. The handle 102 may comprise a ball handle 102 adapted to impart ergonomic function to a user, which may spherical or substantially spherical in shape. The handle 102 may define a plurality of circular recesses 122 disposed at regularly-spaced intervals around a perimeter of the handle 102. In some embodiments, the handle 102 consists of five recesses 122. The handle 102 is adapted to rotate axially about a longitudinal axis of the apparatus 100. In so doing, the handle 102 rotates through torque force a plurality of gears which rotate teeth and/or protuberances within the cylindrical receptacles 106 adapted to grind plant material housing therein.

The handle 102 and the cylindrical receptacle 106 may be formed from polymeric, synthetic, metallic and/or organic materials, including Aluminum, Titanium, stainless steel, fiberglass, nylon, leather and wood.

Plurality of mounting points 104a-c, each mounting point 104 mounted to a top surface of a cylindrical housing receptacle 106.

A triangular base member 108 positions beneath the cylindrical receptacles 106. In the shown embodiments, the triangular base member 108 comprises a single integrated piece adapted to form a friction fit around the base of each of the cylindrical receptacle 106. In other embodiments, each cylindrical receptacle 106 comprises a separate base member 108 which may be removed independently of other base members 108 to expose mechanical workings within a single cylindrical receptacle 106.

Figure 2:
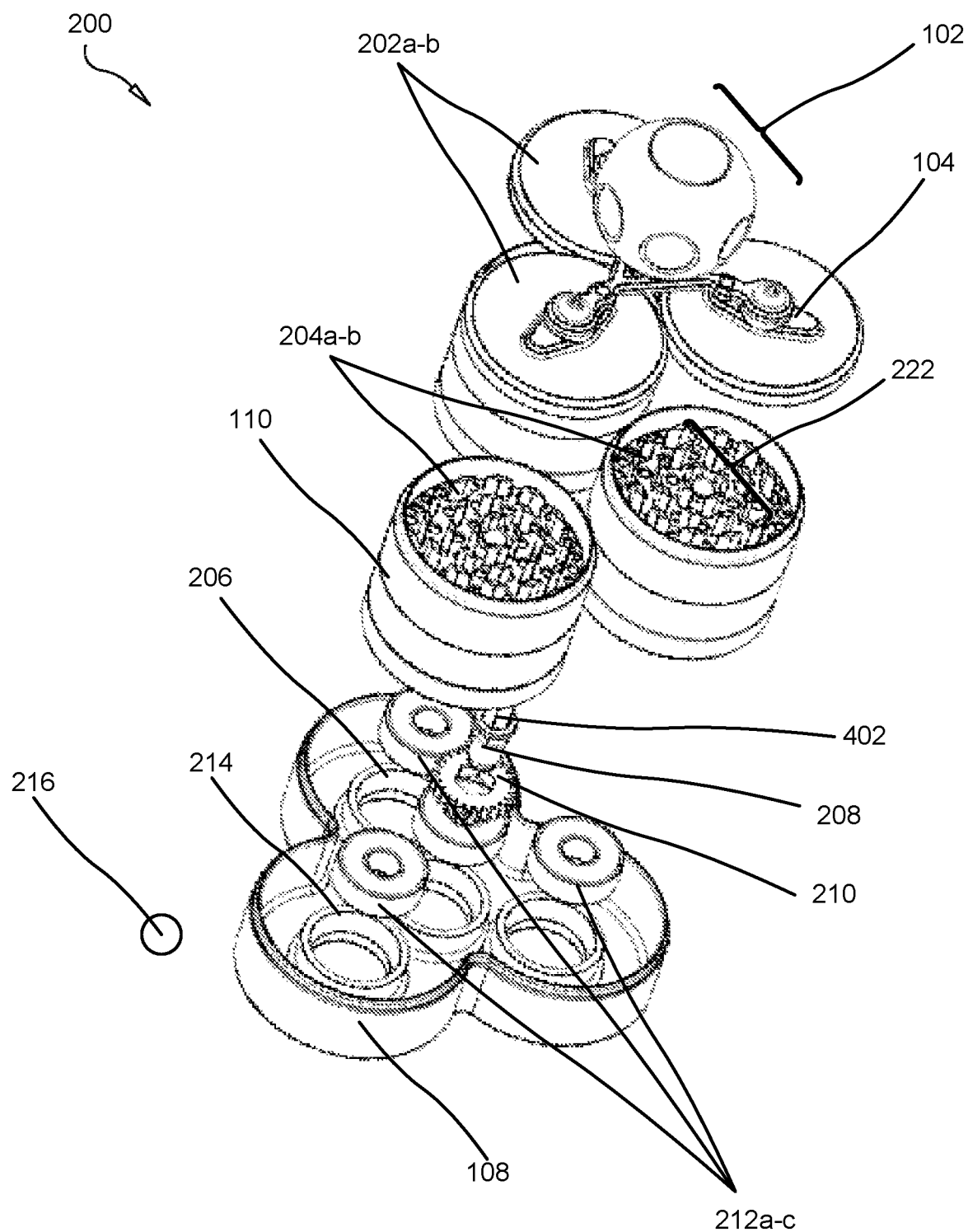
FIG. 2 is an exploded perspective view illustrating one embodiment of a tri-cylindrical herb grinder in accordance with the present invention.

FIG. 2 is an exploded perspective view illustrating one embodiment of a tri-cylindrical herb grinder 200 in accordance with the present invention.

Each cylindrical receptacle 106 defines a hollow interior recess 222 which may be cylindrical. The cylindrical receptacles 106 may be removed, and are detachably affixed to the triangular mounting bracket 302 (further described below) via circular caps 202 positioned superiorly to the cylindrical receptacles 106. Plant material is positioned within the hollow interior recess(es) 222, then the caps 202 put in place over the cylindrical receptacles 106. In various embodiments, the cylindrical receptacles 106 form a friction fit with the caps 202 and/or threadably engage the caps 202 using threading on the caps 202 and cylindrical receptacles 106 adapted to mate one with another.

The apparatus 200 comprises an elongated shaft 402 which traverses the grinder 200 longitudinally. The shaft 402 is affixed to the handle 102 and adapted to rotate axially when the handle 102 is turned. The shaft 402 may comprise an elongated rod, shaft or tube which interconnects the handle with a gear 210. The gear 210 may, or may not, comprise a reduction gear. The shaft 402 may be cylindrical or hexagonal as shown, or otherwise shaped as known to those of skill in the art.

The gear 210 engaged three other lower gears 702 (further described below), each lower gear 702 affixed to (or beneath) a bottom surface of cylindrical receptacle 106. Thus, when the handle 102 is rotated, the cylindrical receptacles 106, or teeth 204 within the cylindrical receptacles 106, are accordingly rotated with the lower gears 702.

In various embodiments, a plurality of cylindrical protuberances 214 rise superiorly from an interior surface of the triangular base member. Each of these cylindrical protuberances 214 defines a hollow interior cylindrical recess which may house a removable washer 212 and/or a plurality of ball bearings 216. In other embodiments, the washer 212 is replace with a simple annular insert 212 which may be formed of polymeric materials. A washer 212 may also dispose around or beneath the shaft 402. The triangular base member 108 may consist of three or four cylindrical protuberances, one for each cylindrical receptacle 106 and one for the shaft 402.

A ferrule 208 may dispose on the terminal inferior end of the shaft 402, which ferrule 208 may engage the gear 210 and/or a washer 212 and/or a cylindrical protuberance 214. The caps 202 may each comprise, in some embodiments, a plurality of teeth 204 jutting inferiorly from an inner surface of the cap 202. The teeth 204 may comprise jagged protuberances, each sharp angle and edges, of varying dimensions, adapted to engage plant matter disposed within the cylindrical receptacles 106. The teeth 204 are operable in connection with teeth 204 within the receptacles 106 to grind plant matter, including cannabis, herbs, and other material known to those of skill in the art.

In various embodiments, the teeth 204 within the receptacles 106 are rotated by a plurality of stabilizing shafts 504 traversing each receptacle 106 longitudinally, the teeth 204 connected to a stabilizing shaft 504, such that the teeth 204 within a receptacle 106 rotate axially when the handle is turned but the exterior sidewall 110 of the receptacles remains fixed in place related to the triangular mounting bracket 302. The stabilizing shaft may comprise a flange disposed between the shaft and the cylindrical receptacle 106.

Figure 3:
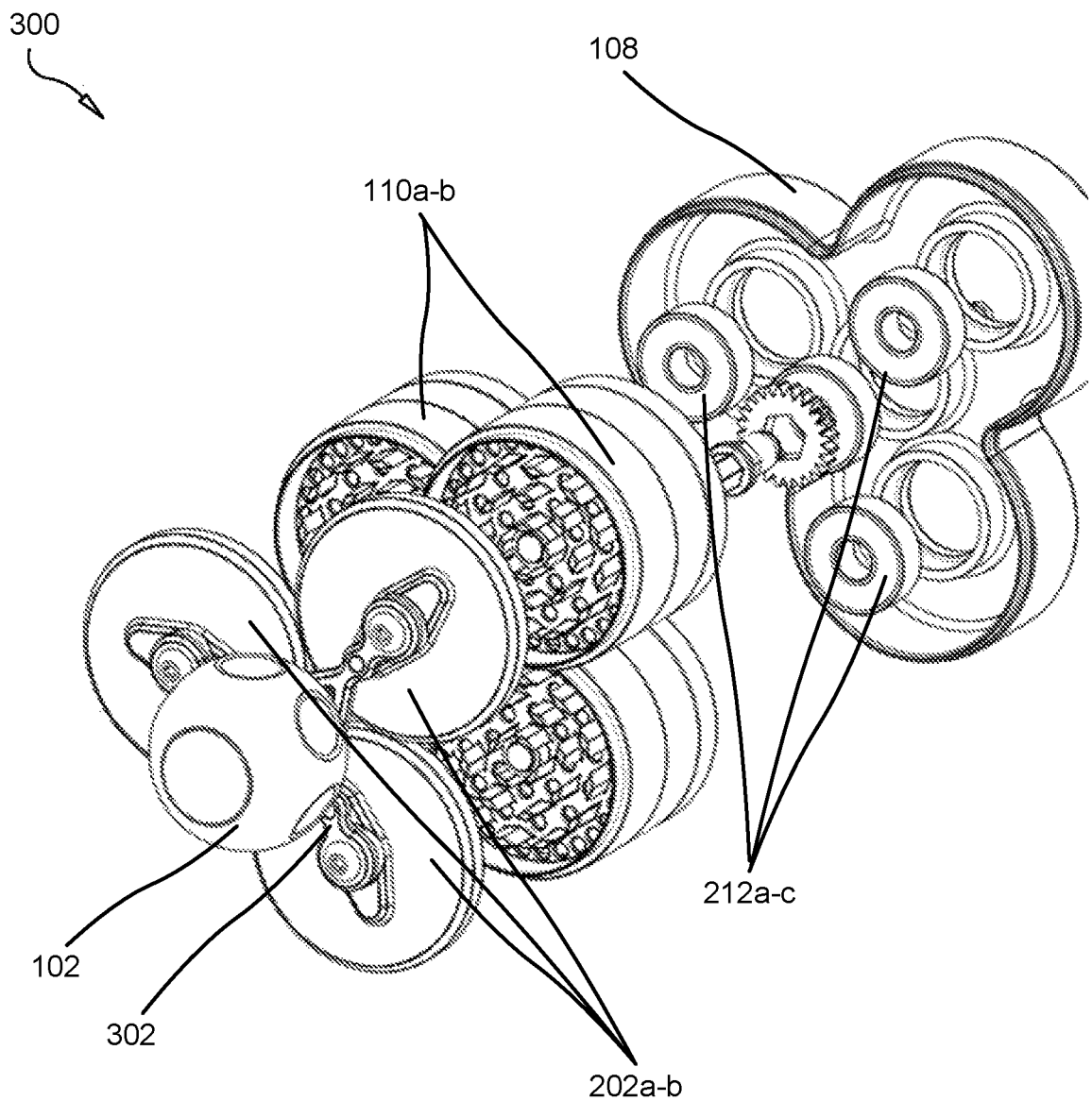
FIG. 3 is an exploded perspective view illustrating one embodiment of a tri-cylindrical herb grinder in accordance with the present invention.
Figure 4:
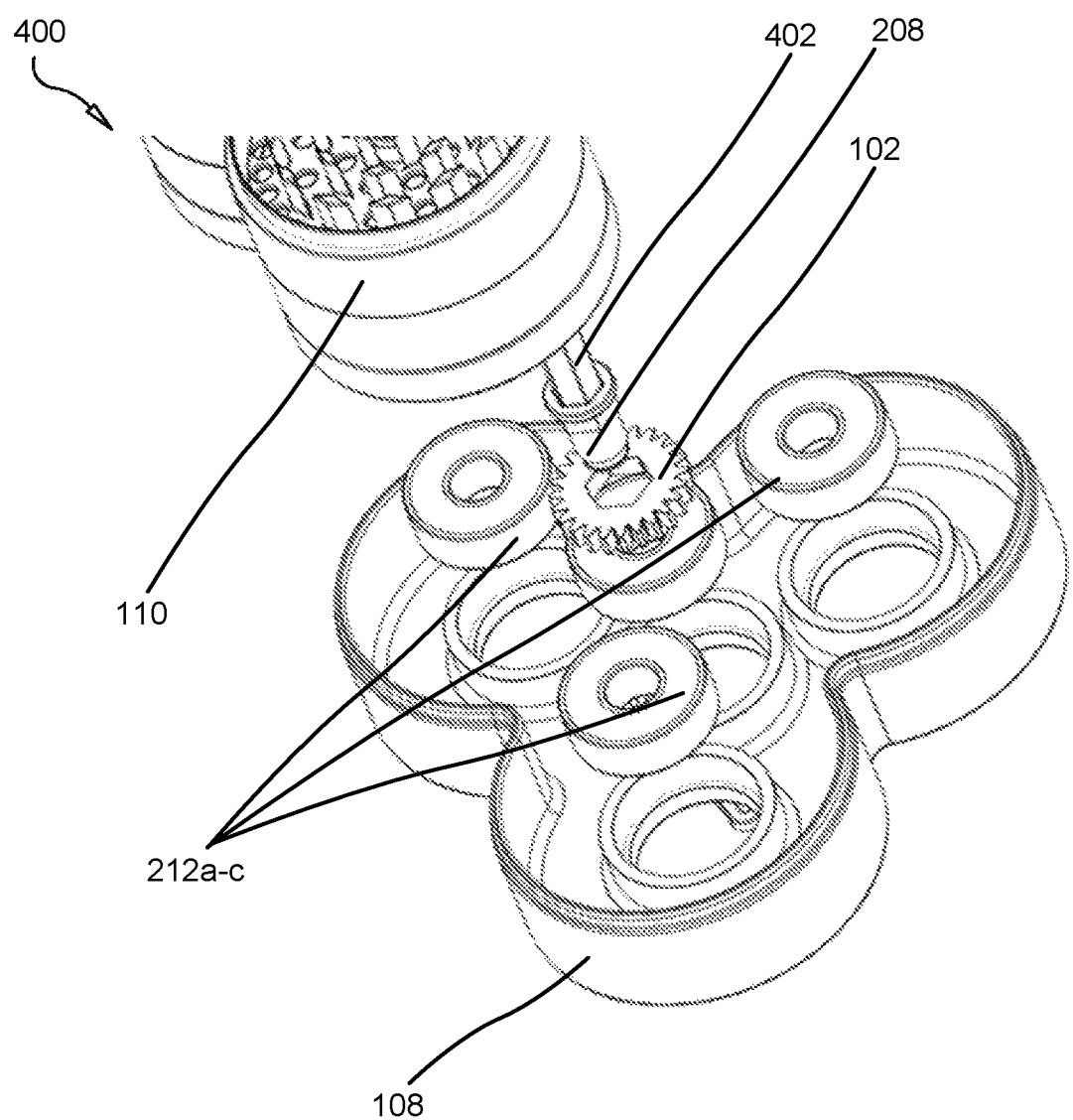
FIG. 4 is an exploded perspective view illustrating one embodiment of a tri-cylindrical herb grinder in accordance with the present invention.

FIGS. 3-4 are exploded perspective views illustrating one embodiment of a tri-cylindrical herb grinder 300, 400 in accordance with the present invention.

A triangular mounting bracket 302 interconnects the handle 102 and the cylindrical receptacle 106.

Figure 5:
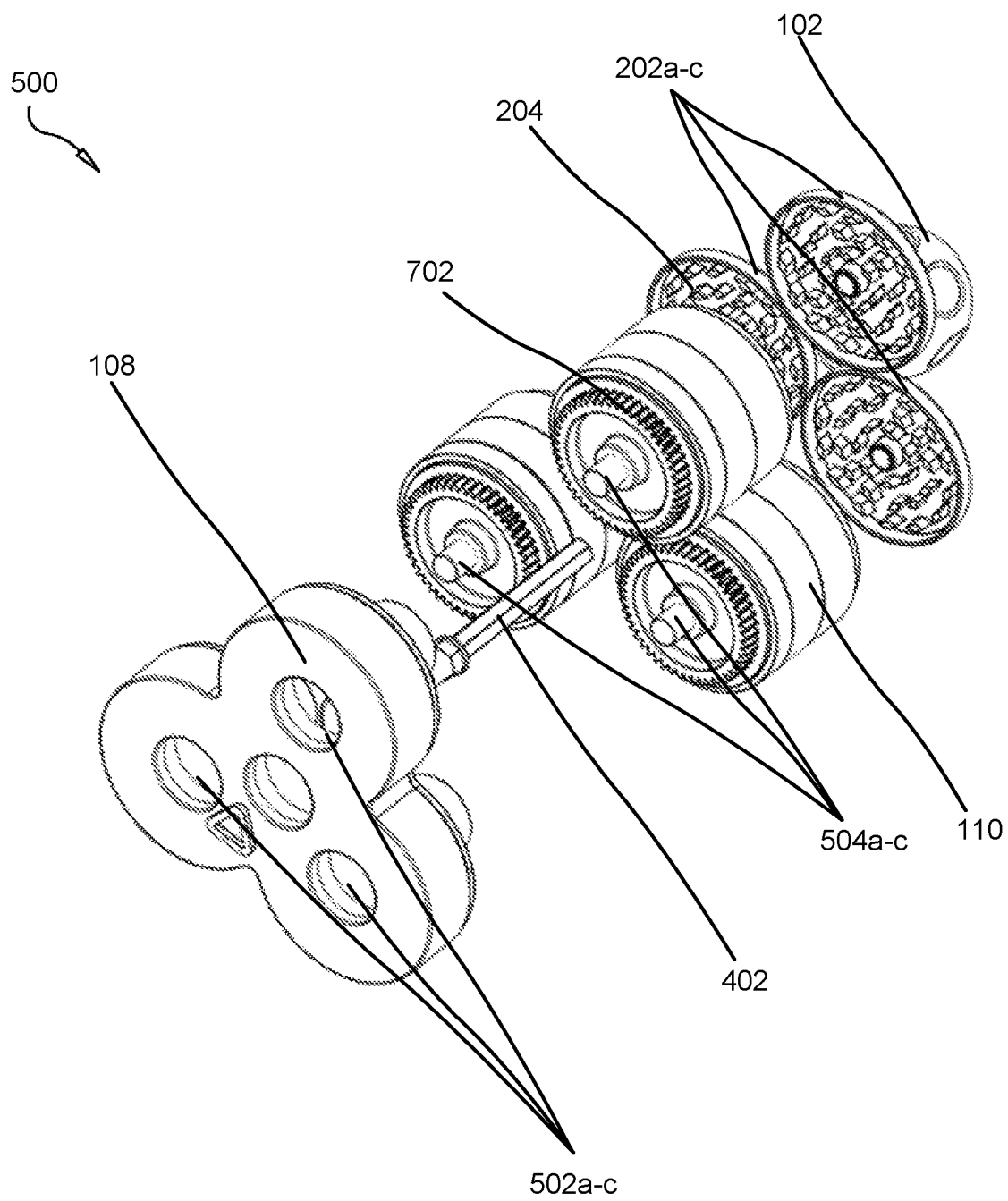
FIG. 5 is an exploded perspective view illustrating one embodiment of a tri-cylindrical herb grinder in accordance with the present invention.

FIG. 5 is an exploded perspective view illustrating one embodiment of a tri-cylindrical herb grinder 500 in accordance with the present invention.

A plurality of bore holes or apertures 502 may be defined by the triangular base member 108.

Figure 6:
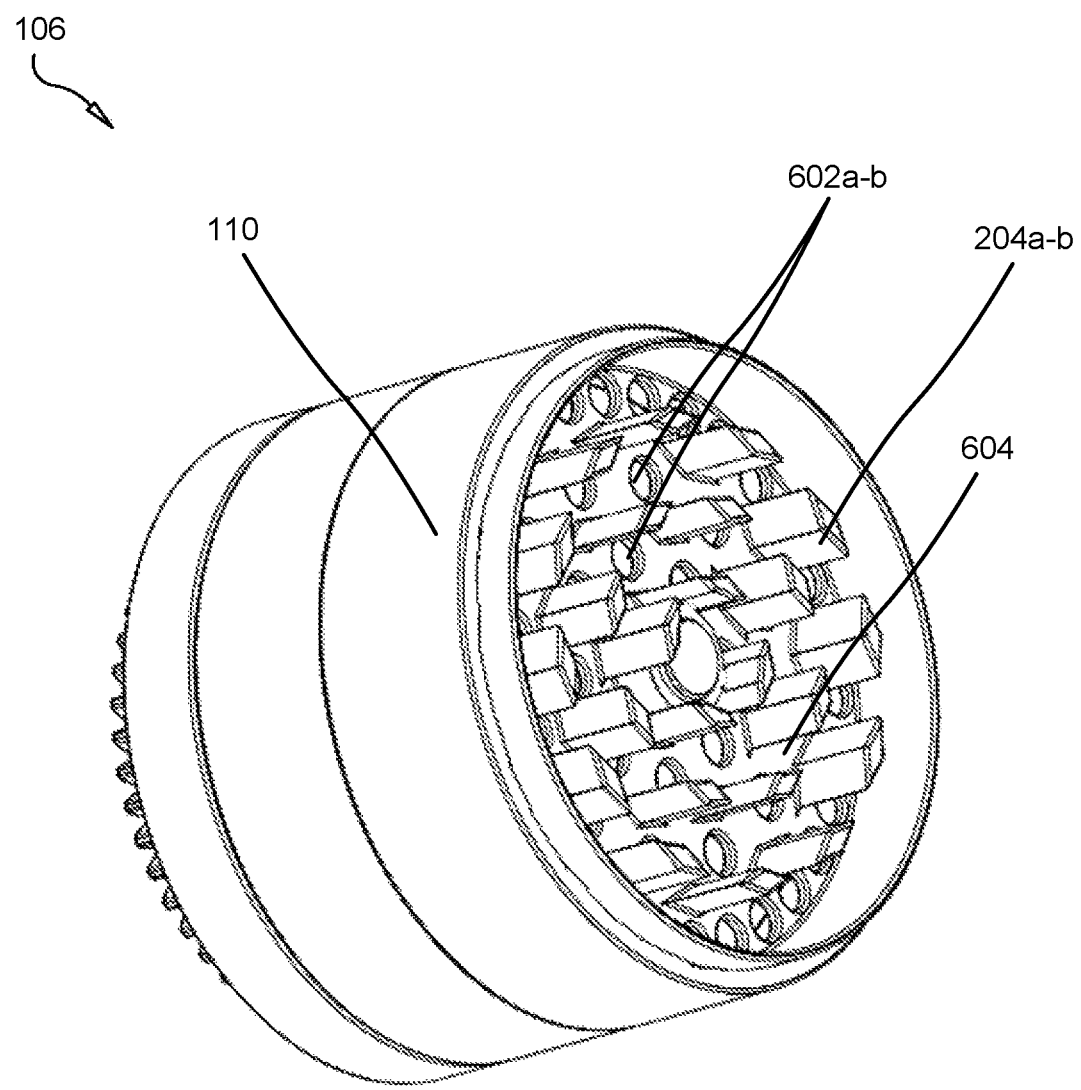
FIG. 6 is a bottom perspective view illustrating one embodiment of a cylindrical housing of tri-cylindrical herb grinder in accordance with the present invention.

FIG. 6 is a bottom perspective view illustrating one embodiment of a cylindrical housing of tri-cylindrical herb grinder in accordance with the present invention.

In some embodiments, the cylindrical receptacles 106 comprise a floor 604 from which the teeth 204 rise or jut. The floor 604 may comprise a plurality of apertures 602 or predetermined diameter, each aperture 602 adapted to allow particulate, or ground plant matter, of only a predetermined diameter to fall through the floor 604 and out of the apertures 502 (or alternatively into a tray integrated with the apparatus 100).

The apertures 502 may be disposed at regularly spaced, or irregularly spaced, intervals across the floor 604.

In this manner, the floor 604 acts as a screen to allow ground plant matter to escape the grinding process only when sufficiently ground to the predetermined diameter, which may be as small as 1 mm or up to 10 mm in diameter. In various embodiments, the diameter of the apertures 502 within each separate cylindrical receptacle 106 varies from one receptacle 106 to the other. Thus each cylindrical receptacle 106 may be adapted to grind a different species of plant material or to grind plant material to a different diameter.

Figure 7:
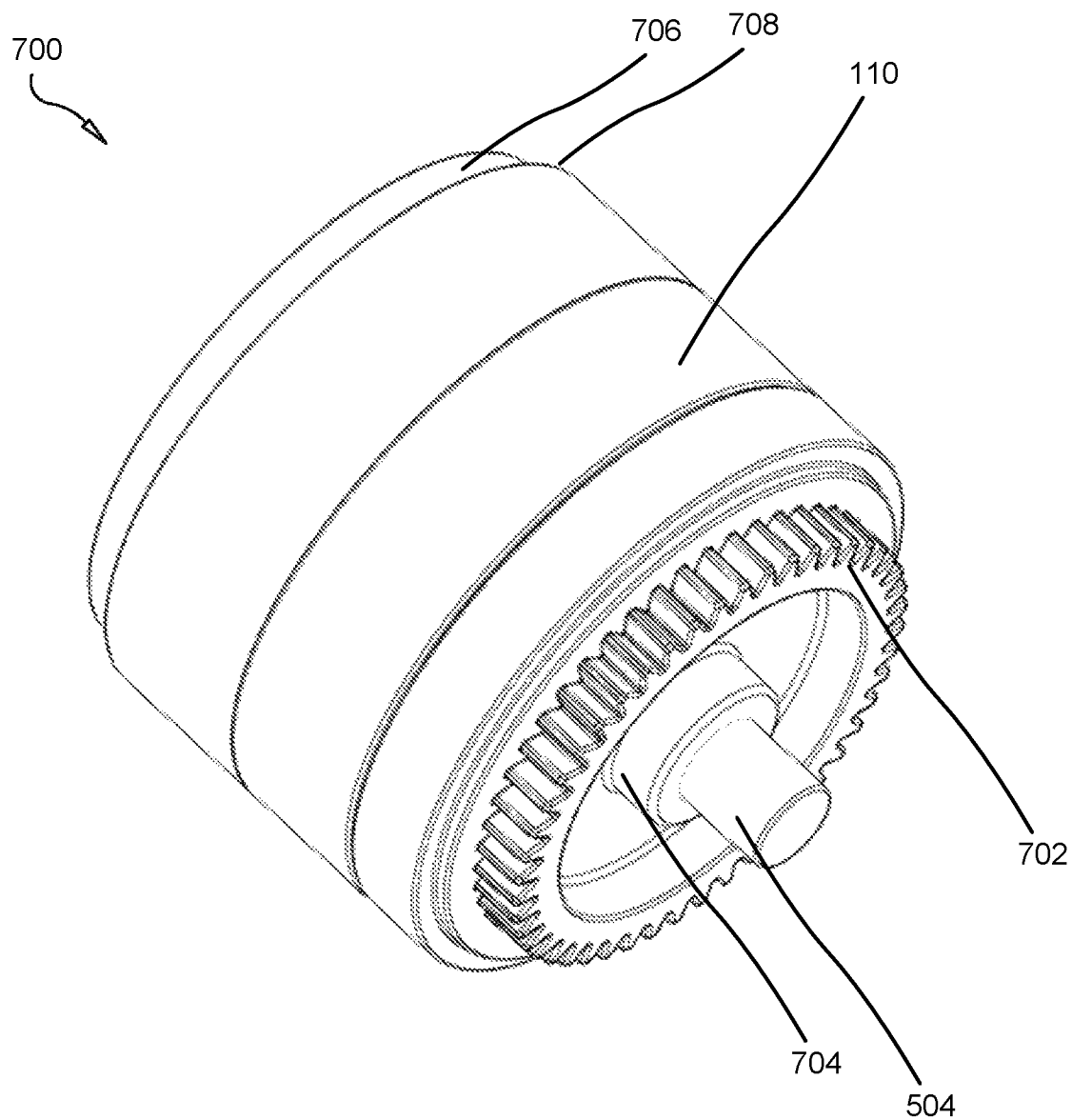
FIG. 7 is a top perspective view illustrating one embodiment of a cylindrical housing of tri-cylindrical herb grinder in accordance with the present invention.

FIG. 7 is a top perspective view illustrating one embodiment of a cylindrical housing of tri-cylindrical herb grinder 700 in accordance with the present invention.

In various embodiments, the top edge 708 of the cylindrical receptacle 106 affixed to an annular flange 706, or skirt 706, which is tapered to a more narrow diameter than that of the middle of the cylindrical receptacle 106. Thus, the cylindrical receptacles 106 comprise a skirt 706 adapted to mate with a cap 202.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tri-cylindrical herb grinder, the grinder comprising:
three cylindrical receptacles, each receptacle defining a hollow interior recess, the cylindrical receptacles comprising:
a hollow cylindrical body;
an annular skirt affixed to a top edge of the receptacle, the annular skirt more narrow in diameter than a main body of the cylindrical receptacle;
a lower gear;
a stabilizing shaft protruding downwardly from the cylindrical body;
a plurality of teeth adapted to grind plant material;
a triangular mounting bracket affixed to three circular caps;
a handle disposed above the triangular mounting bracket, adapted to rotate axially relative to the triangular mounting bracket;
a triangular base member affixed to the cylindrical receptacles;
an elongated shaft interconnecting the handle and a gear, the elongated shaft traversing the receptacles longitudinally;
wherein the gear simultaneously engages all three lower gears, such that the lower gears are axially rotated with the handle.

2. The apparatus of claim 1, wherein the cylindrical receptacles further comprise a floor defining a plurality of apertures, the apertures of a predetermined diameter, the apertures adapted to allow ground plant material failing to exceed the diameter to fall through the apertures.

3. The apparatus of claim 1, wherein each cap comprises a plurality of downwardly protruding teeth.

4. The apparatus of claim 3, wherein the plurality of downwardly-protruding teeth comprise variously dimensioned sharp, jagged protuberances.

5. The apparatus of claim 1, wherein the handle is spherical.

6. The apparatus of claim 5, wherein the handle defines a plurality of recesses serving ergonomic function.

7. The apparatus of claim 1, wherein the triangular base member is affixed using a friction fit.

8. The apparatus of claim 1, further comprising a plurality of annular inserts positioned within cylindrical protuberances rising from a surface of the triangular base member.

9. The apparatus of claim 1, wherein the plant material comprises cannabis.

10. The apparatus of claim 1, further comprising a ferrule affixed to a terminal end of the elongated shaft.

11. The apparatus of claim 1, wherein the bodies of the cylindrical receptacles form a friction fit with the caps.

* * * * *